March 3, 1953

O. E. WOLFF 2,630,385

SEALED PHOTOGRAPHIC FILM ROLL

Filed Oct. 30, 1948

INVENTOR
Otto E. Wolff
BY Donald C. Brown
and Oliver H. Hayes
Attorneys

March 3, 1953          O. E. WOLFF          2,630,385
SEALED PHOTOGRAPHIC FILM ROLL Filed Oct. 30, 1948          2 SHEETS—SHEET 2

INVENTOR
Otto E. Wolff
BY Donald L. Brown
and Oliver H. Hayes
Attorneys

Patented Mar. 3, 1953

2,630,385

UNITED STATES PATENT OFFICE 2,630,385

SEALED PHOTOGRAPHIC FILM ROLL

Otto E. Wolff, Cambridge, Mass., assignor to Polaroid Corporation, Cambridge, Mass., a corporation of Delaware Application October 30, 1948, Serial No. 57,564

5 Claims. (Cl. 95—9)

This invention relates to photography and more particularly to a novel photographic sheet material which is in roll form for insertion in a camera, the roll of sheet material being arranged so as to be unrolled within the camera during use. This invention is especially directed to improved photographic products for use in cameras of the type described in the copending application of Joseph F. Carbone et al., Serial No. 780,344, filed October 17, 1947, for Self-Developing Camera (now Patent No. 2,455,111, issued November 30, 1948).

A principal object of the present invention is to provide a novel arrangement of such a roll of photographic sheet material wherein a rupturable seat is provided for maintaining the sheet in rolled-up form during handling while permitting easy breaking of this seal after the rolled-up sheet has been positioned in the camera and a leader, forming a part of the sheet, is pulled to advance the sheet within the camera.

Another object of the invention is to provide two such rolls of sheet material, one roll being a photosensitive sheet and the other roll being an image-carrying sheet, each roll containing a rupturable seal and an extending leader, the two leaders being joined together to provide a composite product which may be readily inserted in the camera with no danger of the sheets becoming prematurely unrolled.

Still another object of the invention is to provide a one or two roll product which is simple and cheap to manufacture and assemble.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
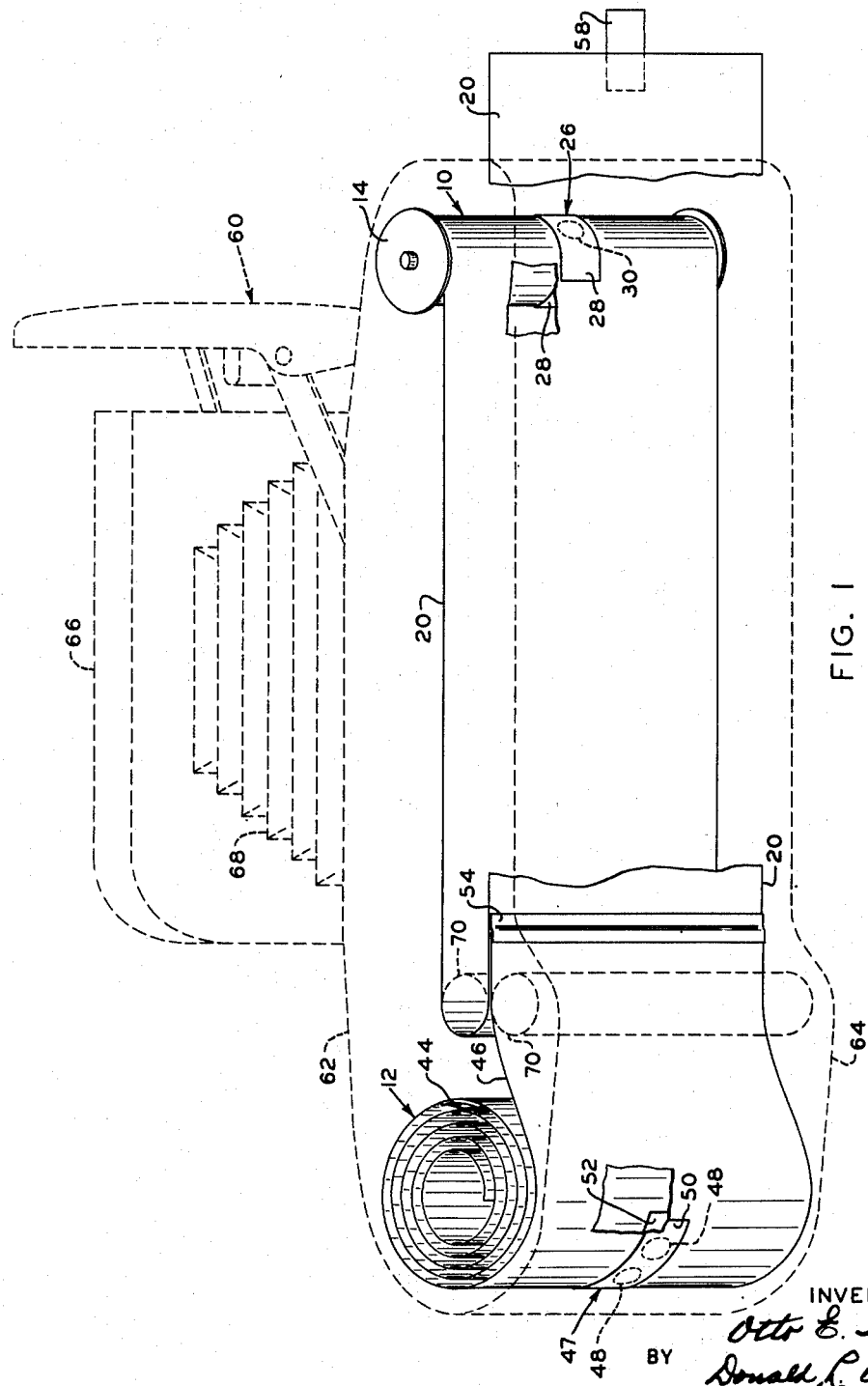
Figure 1 is a diagrammatic isometric view, with portions cut away, of one preferred form of the invention, a preferred type of camera for using the product being shown in dotted lines in operative relationship to the product.
Figure 2:
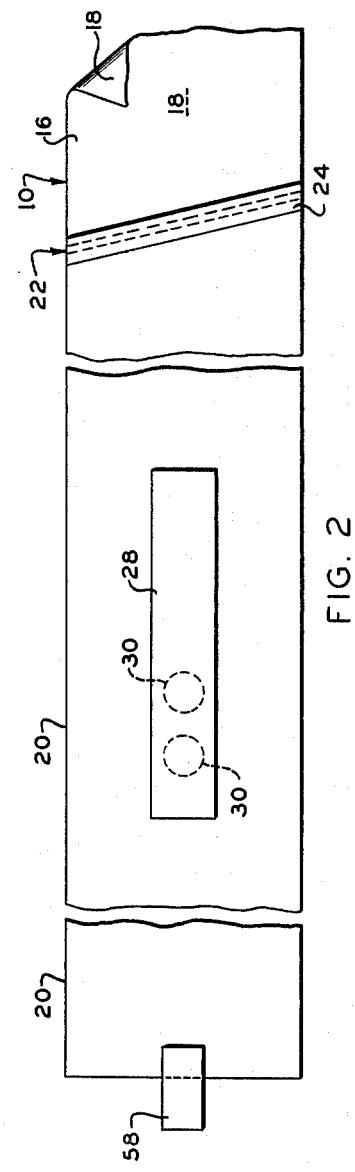
Fig. 2 is a diagrammatic plan view of the outer surface of the photosensitive sheet in unrolled form showing a preferred type of rupturable seal therefor.

In general this invention relates to a photographic product comprising a sheet of photographic material formed into a roll. The outer layers of the rolled photographic sheet constitute a leader for threading the sheet through a photographic apparatus such as a camera, two of the outer layers of the leader being sealed together by a rupturable seal. This invention is particularly directed to an improved type of such seal for maintaining the sheet in rolled-up condition, this seal being sufficiently strong to maintain the sheet rolled up during normal handling of the product but being readily ruptured when that portion of the leader extending beyond this seal is pulled after the rolled-up product has been positioned in the camera. This seal preferably comprises a limited area of a pressure-sensitive adhesive associated with a portion of the leader and so positioned as to contact, and adhesively unite, this leader portion to the next inner layer of the leader in the roll. That portion of the next inner layer of the leader, to be contacted by the pressure-sensitive adhesive, preferably has a smooth surface stratum to which the adhesive will adhere sufficiently strongly to prevent accidental rupturing of the seal but from which the adhesive is cleanly stripped when the leader is pulled to unroll the sheet. The portion of the leader, which is associated with the seal, preferably includes at least one hole therein and the seal preferably comprises a strip of tape secured to the outer surface of the leader and at least partially covering this hole. This tape has a pressure-sensitive adhesive coating on that surface thereof adjacent the leader. The next inner layer of the leader preferably includes a smooth-surfaced strip of tape secured to that portion of the surface of the leader which underlies the hole when the leader is in its rolled-up condition. The outer smooth surface of this strip of tape thereby provides the surface stratum from which the pressure-sensitive adhesive tape is cleanly stripped. In a preferred product of the present invention, there is provided a roll of a photosensitive sheet, such as a silver halide, and a second roll of an image-carrying sheet, these two sheets being arranged to be brought into face-to-face contact after exposure of the photosensitive sheet so as to produce a negative image on the photosensitive sheet and a positive image on the image-carrying sheet by releasing a processing liquid from a container preferably secured to the inner surface of the image-carrying sheet. In a preferred form of the invention both the image-carrying sheet roll and the photosensitive sheet roll include rupturable seals of the type mentioned above.

Referring now to the drawings, where like numbers refer to like elements in the various figures, the composite product is shown as a two-roll assembly comprising one roll 10 of the photosensitive sheet and another roll 12 of the image-carrying sheet. The photosensitive sheet 10 is preferably wound on a spool 14 and comprises a photosensitive portion 16 having a silver halide photosensitive layer 18 on the inner surface thereof. A portion of the photosensitive sheet 10 comprises a leader 20 which is preferably secured to the photosensitive portion 16 thereof along a transversely tapered connection 22 by means of a pressure-sensitive adhesive tape 24. The rupturable seal, generally indicated at 26 in Fig. 1, preferably comprises a strip 28 of a pressure-sensitive adhesive tape, this strip 28 overlying a pair of holes 30 in the photosensitive sheet leader 20. In a preferred form of the invention strip 28 is preferably longer than the circumference of the roll so that one end of the strip underlies that portion of the strip 28 which is positioned over the holes 30.

In assembling the roll of photosensitive sheet 10, leader 20 is preferably pierced by a suitable die to form the two holes 30 and then the strip 28 is placed over the two holes 30 with its pressure-sensitive adhesive coating 32 adjacent the leader 20. The strip 28 is firmly pressed against the outer surface of the leader 20 so that the pressure-sensitive coating 32 firmly bonds the strip 28 to the leader 20. A predetermined length of photosensitive silver halide sheet is cut from a supply thereof and secured to the leader 20 by means of the adhesive tape 24. The end of the photosensitive sheet is then secured to the spindle of spool 14, such as by passing a tapered end of the sheet through a slot of the spool, and the photosensitive sheet and the leader are then wound up on the spool. During this winding operation, pressure is applied to at least the outer layers of the leader 20 to press the pressure-sensitive coating 32 through the holes 30 so that coating 32 thereby contacts and adheres to the outer layer of strip 28 on the next inner layer of the leader. The formation of the rupturable seal by this pressing operation is shown in greater detail in Fig. 4 where the various elements are shown in enlarged form.

Figure 4:
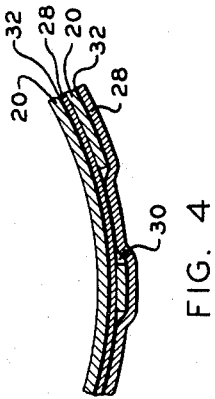
Fig. 4 is an enlarged schematic diagrammatic sectional view of the rupturable seal of Fig. 2 when the product of Fig. 2 is in its rolled form.

As can be seen best in Fig. 4, the pressure-sensitive adhesive coating 32, carried by the outer layer of strip 28, is pressed into adhesive contact with the outer surface of the inner layer of strip 28. Since the outer surface of this inner layer of strip 28 is relatively smooth and nonfibrous, the adhesive coating 32 does not adhere thereto so strongly as to prevent separation thereof during unrolling of the leader from the roll of photosensitive sheet. However, the pressure-sensitive adhesive coating 32 does adhere to this inner layer surface sufficiently tightly to permit the roll of photosensitive sheet to be handled without much care during loading of the camera. For example, the spool can be supported solely by that portion of the leader extending from the seal without causing the seal to rupture.

Figure 3:
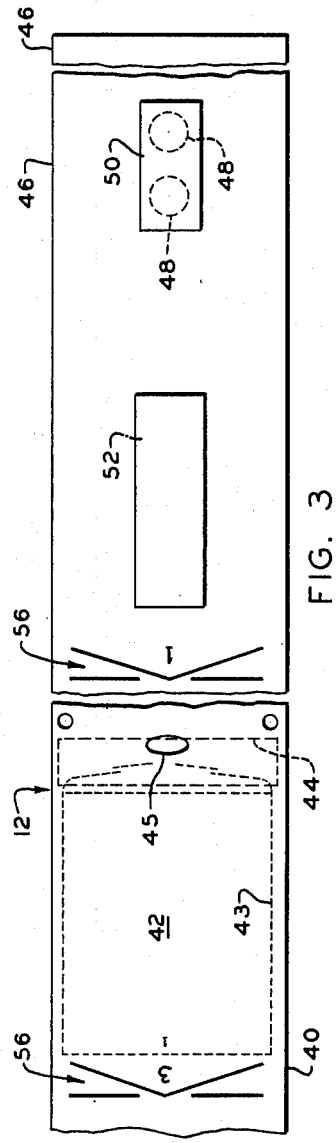
Fig. 3 is a diagrammatic plan view of the outer surface of the image-carrying sheet in unrolled form showing a preferred type of rupturable seal therefore.

The preferred form of image-carrying sheet 12 is shown in Fig. 3 as comprising a portion 40 including a plurality of image areas 42 sequentially arranged on the inner surface thereof. Each of these image areas 42 is preferably defined by perforations 43 extending around the boundary of each image area. Associated with each image area there is preferably provided a container 44 positioned on the inner surface of the image-carrying sheet and releasably carrying a processing liquid. A hole 45 is preferably included in the image-carrying sheet adjacent a transverse edge of each image area to assist in tearing out each processed image area along the lines defined by the perforations 43. The image-carrying sheet has a portion forming a leader 46, this portion being preferably integral with portion 40, and the leader 46 being preferably somewhat shorter than the leader 20 for the photosensitive sheet 10. Near the outer end of the image-carrying sheet leader 46 there are provided two holes 48, these holes being covered by strip 50 of a pressure-sensitive adhesive tape similar to strip 28 associated with the photosensitive sheet leader 20. A second strip 52 of a pressure-sensitive adhesive tape is applied to the same surface of the leader 46 so as to be in position to underlie the holes 48 when the image-carrying sheet is rolled up. Suitable indicia 55 are preferably included on the back surface of image-carrying sheet 12 to aid in properly positioning the two sheets during use. When forming a roll of the image-carrying sheet 12, the inner end thereof is held by a suitable coiling mechanism and the sheet is rolled upon itself, no spool being employed in this case. As the end of the image-carrying sheet leader is wound around the roll, the outer layers of the leader are pressed against the formed roll so as to cause the pressure-sensitive adhesive coating, carried by outer strip 50, to be forced through holes 48 and to contact and adhere to the outer surface of inner strip 52 to create the rupturable seal which is indicated at 47 in Fig. 1. There is thus formed the same kind of rupturable seal as mentioned in the description of the photosensitive roll 10 and shown in detail in Fig. 4.

The free end of the leader 46, on the image-carrying sheet, is then preferably joined to the leader 20, extending from the photosensitive roll 10. The junction between these two leaders is preferably formed by the use of a strip of thermoplastic adhesive coated tape 54, thus forming a relatively permanent bond between these two leaders. That portion of the photosensitive sheet leader 20 extending beyond the junction of the two leaders is preferably wrapped around the two rolls during the manufacture of the product so as to form a compact assemblage which may be readily handled and packaged. In order to prevent unrolling of the outer end of the photosensitive sheet leader 20, it is preferably temporarily sealed by means such as a strip 58 of pressure-sensitive adhesive.

In a preferred form of the invention, the photosensitive portion 16 of sheet 10 comprises a suitable paper base carrying a relatively "fast" silver halide photosensitive layer 18, such as a layer of a gelatino silver iodobromide emulsion. The leader 20 preferably comprises the usual leader stock such as duplex red and black paper, Knowlton grade 605, the leader being very slightly wider than the photosensitive portion 16 so as to form a good light seal. The spool 14 is preferably a molded styrene which includes a filler for rendering the styrene opaque to actinic light. The image-carrying sheet 12 preferably comprises baryta paper which has been treated in accordance with the teachings in the copending application of Edwin H. Land, Serial No. 790,603, filed December 9, 1947, for Photographic Apparatus (now Patent No. 2,520,641, issued August 29, 1950), and the liquid in container 44 preferably comprises a viscous aqueous alkaline solution of a developer and a silver halide solvent in the proportions listed in said copending application of Edwin H. Land.

The various strips of pressure-sensitive adhesive 28, 50 and 52 preferably comprise smooth lustrous nonfibrous sheeting such as transparent cellulosic films, i. e., regenerated cellulose and cellulose acetate or other synthetic and natural materials such as resins. The sheeting has a pressure-sensitive adhesive coating firmly united thereto. Equally, the sheeting may comprise a fibrous support having the adhesive on one surface and a smooth coating on the other surface. Examples of such tapes are those sold by the Minnesota Mining and Manufacturing Co. under the trade-mark "Scotch Tape." One particularly useful tape of the above type is that sold under the trade-mark "Acetate Fibre." Numerous examples of the methods of preparing such tapes are given in United States Patents 2,156,380 and 2,183,330. The pressure-sensitive adhesive tape 24, sealing leader 20 to the photosensitive portion 16 of the photosensitive sheet, preferably comprises a black cellulose acetate tape of the same type as mentioned above. A similar adhesive tape is used for adhesive strip 58.

The camera 60, for which the product described above is particularly adapted, is shown in dotted lines in Fig. 1 as comprising a front housing 62 and a rear housing 64. A suitable lens and shutter assembly 66 is connected to front housing 62 by means of the usual bellows 68. For processing the composite product, by releasing the processing liquid from container 44 and spreading the released liquid between superposed areas of the two sheets, there is provided a pair of pressure rolls 70. Front pressure roll 70 is preferably carried by a partition, not shown, while the rear pressure roll 70 is preferably carried by the rear housing 64. The details of such a camera are described and claimed in the above-mentioned copending application of Carbone et al.

In the use of the preferred modification of the invention described above, the strip 58, which holds the end of the photosensitive leader 20 around the two rolls, is removed thereby permitting the outer end of leader 20 to be unwound so that the two rolls are free to be separated as shown in Fig. 1. The rear housing 64 of the camera is swung open, as is the partition which carries the front roll 70. Spool 14 is then positioned in a suitable spool holder, preferably carried by the partition, and the photosensitive sheet leader 20 is led along the front of the partition and around roll 70. The roll of image-carrying sheet 12 is then placed in the position shown, its leader 46 and the outer end of the photosensitive sheet leader 20 being led along the rear of the partition till the end of leader 20 extends from the right-hand end of the camera. The rear housing 64 is then closed, thus making the camera body light-tight. At this point the two seals 26 and 47, associated with the two rolls, are still intact and they thus prevent unrolling of these two sheets till the camera has been made completely light-tight. That portion of leader 20 which extends from the camera is now pulled, thus also pulling the leader 46 so as to break both seal 26 on the photosensitive roll and seal 47 on the image-carrying sheet roll. Further pulling of the leader 20 unwinds the leaders from both rolls and moves an unexposed area of the photosensitive sheet into exposure position in the camera. At the same time, the first image area 42 is moved into position where its associated container is about to pass between the pressure rolls 70. This proper positioning is indicated by aligning the first indicium 56 on the back of the image-carrying sheet with a portion, such as the right-hand end, of the camera. During this movement of the photosensitive sheet 10 the tapered connection 22 permits the relatively thick portion of sheet 10 to pass between pressure rolls 70 without greatly increasing the pull force. The photosensitive area in exposure position is now exposed and those portions of the two leaders extending from the right-hand end of the camera are again pulled to advance the two sheets between the pressure rolls 70. This advancement allows the pressure rolls to release the processing liquid from the first container 44 and spread this liquid between the exposed photosensitive area and the first image area 42, laminating these two areas together and accomplishing a predetermined processing thereof. This processing preferably comprises the concurrent development of a negative image in photosensitive layer 18 and the formation of a positive image on the image area 42. After a predetermined time, such as one minute, a back door in rear housing 64 is opened, the camera user inserts a fingernail through the hole 45 and tears out the processed image area 42, this removal being assisted by perforations 43.

While preferred materials and processes have been described in connection with the discussion of the invention, it should be understood that the invention is of wide application. Other materials and processes than those specified may be employed. For example, other photosensitive materials and processing liquids may be used to record negative or positive images.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic product comprising a length of sheet material formed into a roll, the outer layers of said rolled-up sheet constituting a leader for threading said sheet into a photographic apparatus, and a rupturable seal sealing one of said outer layers to the next inner layer so that the layers of said roll beneath said last-named outer layer are kept from unwinding, a portion of the length of said sheet material extending beyond said seal and being free to unwind from said roll without rupturing said seal, said portion constituting the free end of said leader, said leader having at least one hole therein at said seal, said seal comprising a strip of tape secured to the outer surface of said leader and at least partially covering said hole, and a pressure-sensitive adhesive coating on that surface of said tape adjacent said leader, said strip being sufficiently long to cover that portion of the next inner layer of said rolled-up sheet which underlies said hole, said coating having less affinity for the outer surface of the inner layer of said tape than for said leader.

2. The product of claim 1 wherein the sheet material formed into a roll is a photosensitive silver halide film and the inner layers of said roll include a silver halide stratum while the outer layers of said roll comprise a light-opaque material which constitutes the leader.

3. A composite photographic product comprising a length of sheet material formed into a roll, the outer layers of said rolled-up sheet constituting a leader for threading said sheet into a photographic apparatus, and a rupturable seal sealing one of said outer layers to the next inner layer so that the layers of said roll beneath said last-named outer layer are kept from unwinding, a portion of the length of said sheet material extending beyond said seal and being free to unwind from said roll without rupturing said seal, said portion constituting the free end of said leader, said leader having at least one hole therein at said seal, said seal comprising tape in strip form secured to the outer surface of said leader and including a portion of tape which at least partially covers said hole and also a portion of tape which covers that part of the next inner layer of said rolled sheet which underlies said hole, and a pressure-sensitive adhesive coating on that surface of said tape adjacent said leader, said coating having less affinity for the outer surface of the tape portion which underlies said hole than for said leader.

4. The product of claim 3 wherein the sheet material formed into a roll is a photosensitive silver halide film and the inner layers of said roll include a silver halide stratum while the outer layers of said roll comprise a light-opaque material which constitutes the leader.

5. The product of claim 3 wherein the sheet material formed into a roll comprises an elongated, flexible, image-receiving sheet material for use in a photographic transfer process as image-receptive material for receiving a transfer image.

OTTO E. WOLFF.

REFERENCES CITED

The following references are of record in the file of this patent:

UNITED STATES PATENTS

| Number | Name | Date |
| --- | --- | --- |
| 709,053 | Shaw | Sept. 10, 1902 |
| 778,403 | Cline | Dec. 27, 1904 |
| 823,624 | McCurdy | June 19, 1906 |
| 1,180,415 | Nasief | Apr. 25, 1916 |
| 1,255,017 | Jones | Jan. 29, 1918 |
| 1,372,593 | Blackett | Mar. 22, 1921 |
| 1,454,045 | Dodge | May 8, 1923 |
| 1,536,341 | Hodgson | May 5, 1925 |
| 1,858,585 | Gantnier | May 17, 1932 |
| 1,910,287 | Henderson | May 23, 1933 |
| 1,969,858 | Schnitzler | Aug. 14, 1934 |
| 2,188,779 | Roehrl | Jan. 30, 1940 |
| 2,332,474 | Schusterman | Oct. 19, 1943 |

FOREIGN PATENTS

| Number | Country | Date |
| --- | --- | --- |
| 469,653 | Great Britain | July 29, 1937 |